United States Patent [19]

Bell

[11] 3,882,404

[45] May 6, 1975

[54] TIMING DEVICE WITH PULSE SPLITTING FEEDBACK

[75] Inventor: Reynold W. Bell, Santa Clara, Calif.

[73] Assignee: The Singer Co., New York, N.Y.

[22] Filed: Nov. 29, 1973

[21] Appl. No.: 420,067

[52] U.S. Cl. ........... 328/38; 307/220 R; 307/224 R; 328/41; 328/46; 328/48

[51] Int. Cl. ........................ H03k 5/00; H03k 21/32

[58] Field of Search ........... 307/220, 223, 224, 225; 328/39, 41, 46, 48, 49, 63, 38

[56] References Cited

UNITED STATES PATENTS

| | | | |
|---|---|---|---|
| 3,096,483 | 7/1963 | Ransom | 328/48 |
| 3,341,693 | 9/1967 | Hurst | 328/46 |
| 3,426,296 | 2/1969 | Christiansen et al. | 307/220 R |
| 3,448,387 | 6/1969 | Brandt et al. | 328/38 |
| 3,484,699 | 12/1969 | Israel | 328/48 |

*Primary Examiner*—Stanley D. Miller, Jr.
*Attorney, Agent, or Firm*—James C. Kesterson

[57] ABSTRACT

A gate provides a train of gated pulses in response to input pulses to advance the early stages of a counter. A feedback loop from the counter to the gate temporarily disables the gate at predetermined count conditions. The temporary disablement causes the instance input pulse to be split into two gated pulses of shorter duration. The counter advances twice in response to each split input pulse. The early stages of the counter thus generate a lower frequency timing signal having a basic period equal to the sum of the periods of a predetermined number of gated pulses (whole input pulses plus split input pulses). The ratio of input pulses to gated pulses is determined by which stage or stages feed back to disable the counter. The latter stages of the counter advance in response to the basic timing signal to provide timing signals having periods which are multiples of the basic period.

8 Claims, 6 Drawing Figures

TIMING DEVICE WITH PULSE SPLITTING FEEDBACK

My invention relates to a timing device, and more particularly to a timing device having output pulses which are not simple multiples of the input pulses.

Heretofore prior art traffic controllers have utilized an alternating current synchronous electric motor driven from a power line as a basic timing element. Because power line frequency ordinarily is controlled very accurately by a public utility, the rotational speed of such clock motors has been quite accurate. Various disadvantages have attended the use of such motors, however, such as their size, and the need for much reduction gearing, which is not only costly and which requires maintenance, but which also introduces gear backlash which may result in erratic timing. For traffic control it is desirable to provide timing signals having substantial periods, ranging from fractions of a second, such as one-quarter second and one-half second to multiples of many seconds, e.g. 60 seconds. In order to rotate a camshaft through one revolution comprising a complete traffic cycle, which might have a desired duration of 60 seconds for example, the rotor speed of a 2-pole synchronous motor driven driven by a 60 hz. source must be reduced by a factor of 216,000 to 1. The backlash and timing problems caused by mechanical tolerances involved in motor-operated switches also tends to render clock motors unusable as timing elements in various solid-state electronic traffic controllers, so that some prior traffic controllers have resorted to various other forms of timing. The cost, complexity, and extreme temperature variations to which traffic controllers are subjected preclude the use of various known forms of timing devices such as crystal or tuning-fork-controlled oscillators followed by frequency dividers. In order to take advantage of line frequency accuracy, one prior traffic controller timing scheme includes rectifying the line frequency to provide a pulse train, and the use of additional circuits responsive to the pulse train and operable to provide timing pulses. A problem arises in that it has been difficult and expensive to process pulses occurring at 60 hz (if half-wave rectification is used) so as to provide signals which are accurate fractions and integral multiples of one second. Therefore a primary object of the present invention is to provide an impoved electronic timing arrangement which overcomes that problem using simple and inexpensive circuits which do not require frequent adjustment.

Various applications other than traffic controllers require generation of timing or synchronization signals which are not binary sub-multiples (e.g. one-half, one-fourth, one-eighth etc.) of an input or reference frequency. While generation of binary sub-multiples of an input frequency is ordinarily simple to accomplish using standard flip-flop frequency dividers, the prior art often has had to resort to complex and expensive techniques where signals other than simple binary sub-multiples have been required, including, for example, heterodyning techniques, or undesirably complex frequency division techniques. Therefore another object of the present invention is to provide timing signals which are any desired sub-multiple of an input frequency in a simple and inexpensive manner, and the provision of such apparatus is another object of the invention.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 4C:
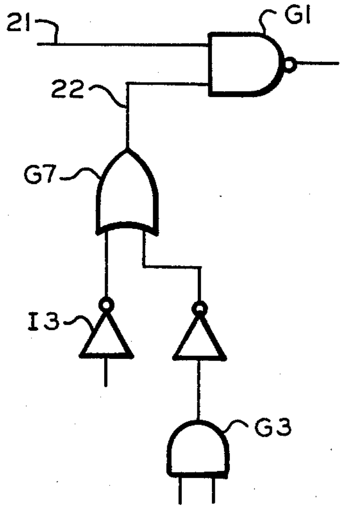
Figure 4A:
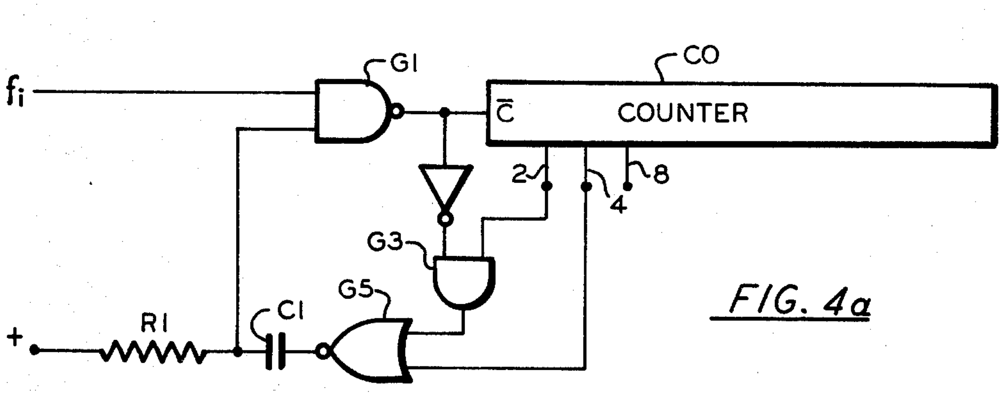
Figure 4B:
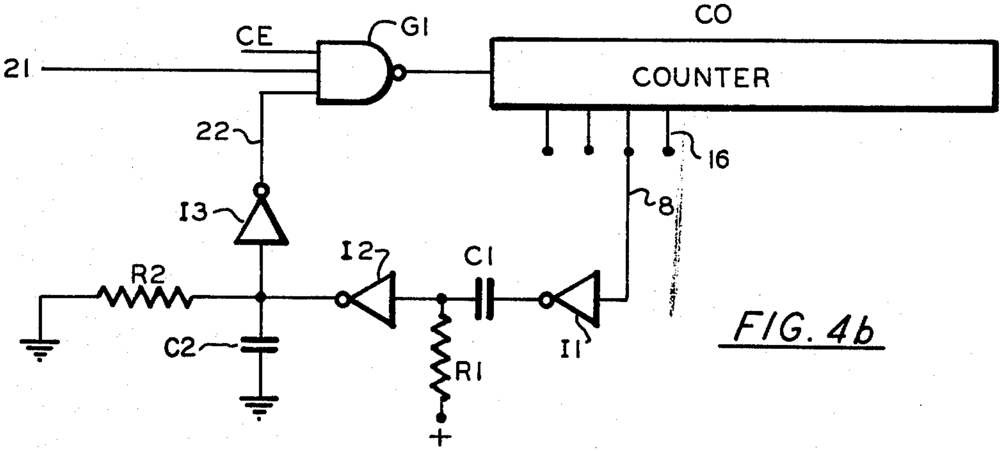

FIGS. 4*a*,4*b* and 4*c* are schematic diagrams illustrating portions of modified forms of the invention.

Figure 1:
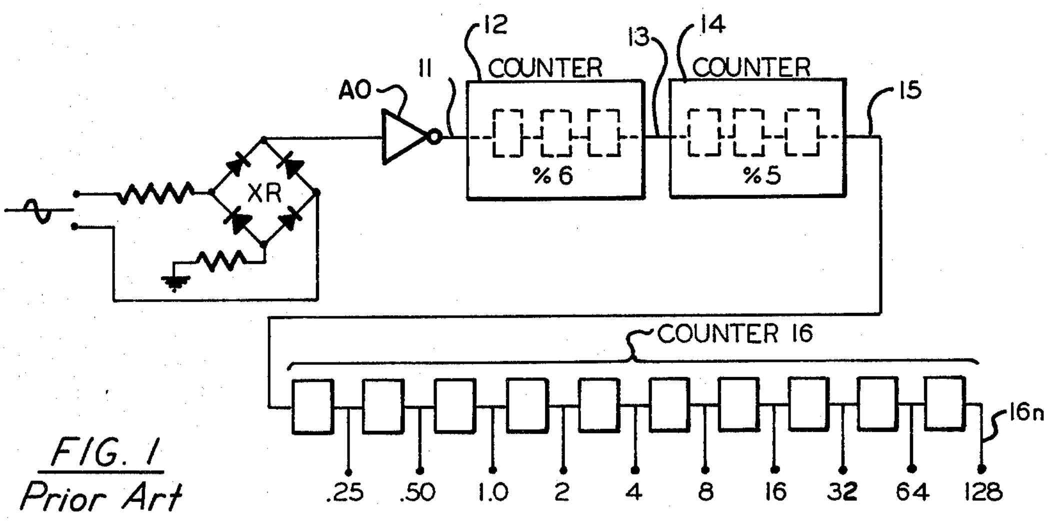
FIG. 1 Prior Art
FIG. 1 is a block diagram illustrating one prior art timing technique.

Referring first to the prior art arrangement of FIG. 1, an alternating signal having a line frequency of 60 hertz is shown applied to a full-wave bridge rectifier XR and amplified by amplifier AO to derive a continuous train of pulses on line 11 at 120 hertz. Amplifier AO comprises a TTL inverter or the like, which shapes the generally sine-shaped pulses from the rectifier into square pulses having TTL-compatible output levels. The pulses on line 11 are first applied to a "divide by six" binary counter 12. Counter 12 requires three binary stages, plus added gating circuitry to prohibit two of the eight possible states of the three stages. Counter 12 receives the pulses on line 11 having a 120 hertz repetition rate and provides output pulses on line 12 at a 20 hertz repetition rate, i.e. a waveform having a period of 0.05 second, or half-cycle duration of 0.025 second. If the counter is enabled to begin counting at time $t_0$, the precise time after $t_0$ at which each count will be registered varies depending upon which portion of the input waveform on line 11 switches the first flip-flop of counter 12. In any event, output line 13 will change state 0.025 second after counter 12 is enabled, less no more than (1/60) second. The pulses on line 13 are applied to a further "divide by five" binary counter 14. Counter 14 also requires three binary stages, plus added gate circuits to skip or prohibit three of its eight states. Counter 14 receives the 20 hertz square waveform on line 13 and provides a 4.0 hertz square waveform on line 15, having a full period of 0.25 second and a half cycle of 0.125 second. Thus output line 15 will change state 0.125 second after $t_0$, the time at which counters 12 and 14 are enabled to begin counting from zero, less no more than (1/60) second. The pulses on line 15 are applied to a succession of cascaded binary stages 16, thereby providing further square output waveforms having repetition rates of 2 hertz, 1.0 hertz, 0.50 hertz, etc., which change state 0.25, 0.5, 1.0 etc. seconds after time $t_0$, with no more than (1/60) second error. If counter 16 includes ten binary stages as shown the waveform provided on the last output line 16n has a period of 256 seconds, or half-cycle duration of 128 seconds. The arrangement of FIG. 1 will be seen to require a total of 16 binary stages. In order that counters 12 and 14 be enabled to divide by six and by five, which are not powers of two, known types of gates must interconnect various stages in those counters, thereby precluding the use of various multi-stage binary counters which are readily available in integrated circuit form with appreciable numbers of bit stages, and thereby usually requiring that counters 12 and 14 be built using individual flip-flops, and added gates and connections (not shown).

Figure 2:
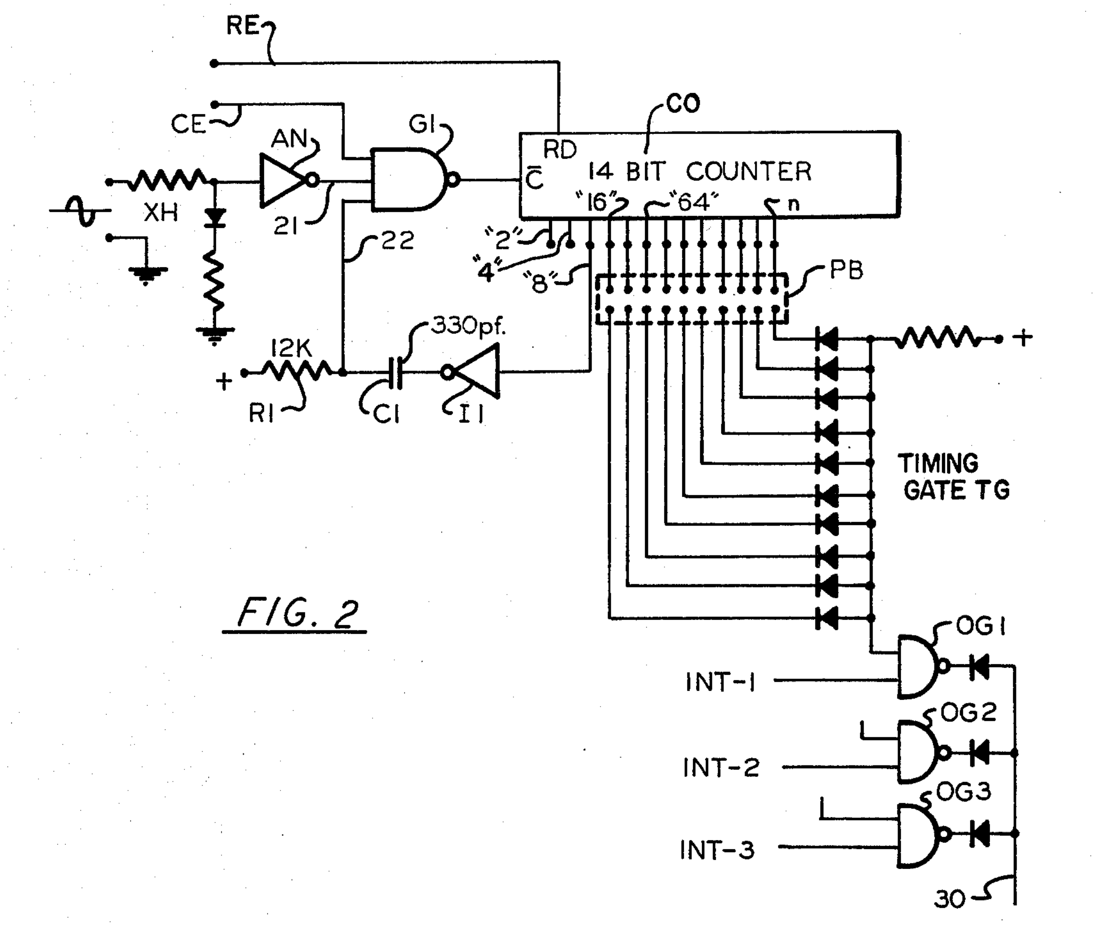
FIG. 2 is an electronic schematic diagram illustrating one form of the present invention embodied in a portion of a traffic controller.

Now referring to the form of the invention illustrated in FIG. 2, the 60 hertz line frequency signal is rectified by half-wave rectifier XH and amplified by amplifier AN to provide pulses at a 60 hertz rate on line 21. Each positive pulse on line 21 will have a duration of almost 8.33 milliseconds. The pulses on line 21 are applied to a suitable coincidence circuit such as a conventional direct-coupled NAND gate G1. The output signals from gate G1 are applied to the input line of a multistage integrated-circuit binary counter CO, such as the commercially-available RCA Type CD4020 14-bit binary counter. Gate G1 receives a second enable input from a control line CE, and a third input from a feed back line 22. Counter CO has a reset input terminal RD which resets the counter to a zero count condition when terminal RE is raised to a logic 1 level. Counter CO has 14 output lines "2", "4", "6", "8"- "*n*", one from each one of its stages. The output line labelled 8 rises, with a brief (e.g. 500 nanoseconds) delay, after counter CO receives the negative-going leading edge of the eighth negative pulse from gate G1 (see FIG. 3).

Figure 3:
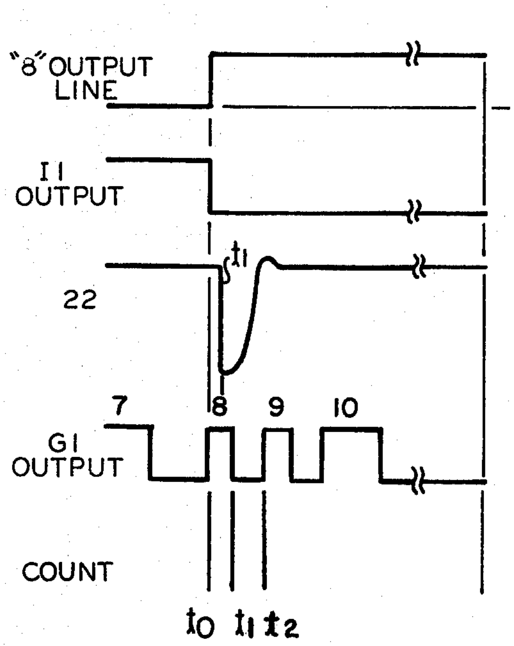
FIG. 3 is a timing diagram useful in understanding the operation of the circuit of FIG. 2.

Assume that counter CO has been reset to a zero count and that line CE to the second input of gate G1 is high. The 8 output line of counter CO initially will be low and logic inverter I1 will provide a steady high output signal. Line 22 will be held high by the positive voltage applied to it through resistor R1, from a positive DC source indicated by a plus sign. The first seven positive pulses from amplifier AN will cause counter CO to count up to a binary count of 00111, or decimal 7. Immediately prior to the 8th pulse, the gate G1 output will be high, the 8 output line of the counter will be low, the I1 inverter output will be high, and the voltage at terminal 22 will be high, as indicated prior to time $t_1$ in FIG. 3. The positive-going leading portion of the eighth positive pulse on line 21 at time $t_0$ will drive the G1 output low, causing a count of binary 1,000 (or decimal 8) to be registered in counter CO, so that the 8 output line of the counter rises, thereby lowering the output from inverter I1. The lowering of the I1 output is differentiated by capacitor C1 and resistor R1, thereby providing a negative spike or notch on line 22, as shown in FIG. 3. The notch appears on line 22 very shortly after the leading edge of the eighth pulse and persists for a time governed by the size of capacitor C1. The notch on line 22 briefly disables gate G1, but gate G1 is then quickly re-enabled at time $t_2$ in FIG. 3, as capacitor C1 charges. The notch causes gate G1 to treat the eighth pulse from amplifier AN as if it were two successive pulses, advancing to a count of 8 at time 0 and to a count of 9 at *t*2. Connecting the 8 output line of counter CO to gate G1 effects a momentary disabling signal to gate G1 during the count of 8.

The succeeding 15 input pulses (9th through 24th) cause counter CO to advance from a count of nine to a count of 25 (decimal) in ordinary fashion. The fifteenth pulse of this succession causes the 8 output line to drop as a count of 16 is registered. However, the rise in the inverter output at that time provides a positive spike on line 22. Because line 22 is already high the fifteenth positive spike has no effect on the number of counts registered in the counter. Thus each rise of the 8 output line causes an extra count to be registered in the counter, while a fall of the 8 output line does not cause an extra count. As 60 successive positive pulses are provided each second from amplifier AN, four extra counts will be registered, as the counter switches to count values of 8, 24, 40 and 56. Thus counter CO will register 64 counts in one second, even through it is basically driven by a source of 60 hertz. The first and second stages of counter CO will provide output waveforms having frequencies of (60/2) and (60/4) hertz, respectively. The fourth stage "16" output line will provide an output waveform having a frequency of (64/16) or 4 hertz, a period of 0.25 second, and the 16 output line will change stage 0.125 second (within (1/60) second) after counting starts from zero. The "32" fifth stage output line and higher order output lines of counter CO will provide square waveforms having frequencies of 2, 1, 0.5, 0.25 - etc., hertz, which will change state 0.25, 0.5, 1.0, 2.0, 4.0 - etc., seconds after counting starts, with no more than (1/60) second error.

In FIG. 2 the output lines 16 to n from the output portion of counter CO and are shown routed to a suitable selective switching means such as a patchboard PB. Selected outputs of counter CO may be connected to input lines of a coincidence circuit such as the 10-input diode AND timing gate TG. By selectively patching the counter output terminals to gate TG one may control when gate TG attains countup and a signal is provided at output gate OG1. For example, by connecting the 32 fifth-stage output line of counter CO, which rises 0.25 second after counting starts, the "64" 6th stage output line which rises 0.50 second after counting starts, and the "128" seventh stage output line which rises 1.0 second after counting starts, gate will have an output signal 1.75 second after counting starts (0.25 + 0.50 + 1.00). By selective use of jumpers at the patchboard, one may provide any countup period between 0.25 second and 255.75 seconds.

In a traffic controller, the output portion of counter CO(output lines 16 to *n*) may be connected to additional patchboards and timing gates (not shown) for controlling output gates OG2 and OG3. The three output gates may be used in association with the green, yellow and red traffic intervals. Then the output signal from line 30 of the diode OR gate shown may be used to advance the traffic controller to successive intervals of its overall program period or cycle.

Different output lines than the 8 output line may be used to notch or temporarily disable the input signal to provide signal ratios other than 60/64. For example, if the 2 output line from the 1st counter stage were connected to inverter I1 instead of the 8 output line, an extra count would be accumulated shortly after the second, sixth, tenth, etc., input pulses were received, and the frequency at the 4 output line of the second stage would be one-third of that of the signal on line 21. Where the output of a single counter stage is used to notch the counter input to add a count, the frequency fo at the output of the next stage may be related to the input frequency $f_1$ as follows: $f_0 = f_i/(2c - 1)$ where *c* is the count value used to notch the counter input. The following table illustrates a few possible relationships, some of which involve replacing inverter I1 with a multi-input AND gate responsive to more than one counter output.

TABLE - I

| Count Value c | Counter Outputs Used | Output Frequency on | Output Line | Rise Time |
|---|---|---|---|---|
| 2 | 2 | $fi/3$ | 4 | $3/2fi$ |
| 3 | 1, 2 | $fi/5$ | 4 | $5/2fi$ |
| 4 | 4 | $fi/7$ | 8 | $7/2fi$ |
| 5 | 1, 4 | $fi/9$ | 8 | $9/2fi$ |
| 6 | 2, 4 | $fi/11$ | 8 | $11/2fi$ |
| 7 | 1, 2, 4 | $fi/13$ | 8 | $13/2fi$ |
| 8 | 8 | $fi/15$ | 16 | $15/2fi$ |
| 9 | 1, 8 | $fi/17$ | 16 | $17/2fi$ |

The first column in Table I represents the count value used to split the pulse passing through gate G1. The second column indicates which counter outputs fed back to gate G1. The third column indicates the output frequency in terms of the input frequency and the fourth column indicates the counter output line where the output frequency occurs. The seventh entry is the FIG. 2 embodiment. The last column of the table labelled "rise time," indicates the time (within one period of the input frequency) at which the indicated output will first change state after the counter is enabled to begin counting from zero. Each of the indicated times may be less than the value given by a maximum amount of $(1/f_i)$ seconds, depending upon the relationship between the time $t_0$ at which the counter is enabled, and the phase of the input signal $f_i$.

Prior art cascaded frequency dividers could divide only by even numbers, but the present invention permits division by any desired odd number, or by any desired product of an odd and an even number. The above table indicates only the single highest odd subharmonic output. Higher order output lines from the counter provide further even sub-harmonics which are the products of an odd and an even number. For example, the first entry in the table, has a 113 *fi* at output 4; but also has a 116 *fi* at output 8, and 1112 *fi* at output 16. The following table II illustrates various division ratios readily obtainable using the arrangements described by the preceding Table I.

TABLE II

| Count Value c | Output Frequencies | | | | | |
|---|---|---|---|---|---|---|
| 2 | 1/3 | 1/6 | 1/12 | 1/24 | 1/48 | — |
| 3 | 1/5 | 1/10 | 1/20 | 1/40 | 1/80 | — |
| 4 | 1/7 | 1/14 | 1/28 | 1/56 | 1/112 | — |
| 5 | 1/9 | 1/18 | 1/36 | 1/72 | 1/144 | — |
| 6 | 1/11 | 1/22 | 1/44 | 1/88 | 1/176 | — |
| 7 | 1/13 | 1/26 | 1/52 | 1/104 | 1/208 | — |
| 8 | 1/15 | 1/30 | 1/60 | 1/120 | 1/240 | — |
| 9 | 1/17 | 1/34 | 1/68 | 1/136 | 1/272 | — |

As mentioned above, the rise times of the outputs in Table I may be less, by a maximum time of $1/f_i$, than the values shown, depending upon the phase relationship of the input signal on line 21 and the time $t_0$ from which the rise time is measured. From comparing time $(1/f_i)$ with the rise time values given in Table I, it can be seen that the timing accuracy of the initial output transitions is poor at lower division ratios, but increases with longer division ratios. The maximum initial rise times of each of the outputs indicated in Table II may each be calculated by halving the reciprocal of the frequency values given, and each such value may be less than the calculated value by a maximum amount of $(1/f_i)$ seconds. When larger frequency division ratios are used, the possible error of $1/f_i)$ seconds will be seen to cause an insignificant percentage error in the initial rise times.

In FIG. 2, and in the other arrangements thus far suggested, an extra count is caused to occur at each odd multiple of a count value c, i.e., 1 × 8, 3 × 8, 5 × 8, 7 × 8, etc., in FIG. 2. It should now become apparent that by series insertion of an added inverter in line 22, or by omission of inverter I1, an extra count would instead occur in FIG. 2 at each even multiple of 8, i.e., at 16, 32, 48, 64, etc., to provide equivalent operation.

FIG. 4a illustrates an arrangement wherein extra counts are caused to occur at multiples of plural integers, gate G3 causing an extra count at each odd multiple of 3, and the 4 output from the second stage causing an extra count at each odd multiple of 4, the outputs of G3 and the 4 output from the second stage being applied to capacitor C1 through a NOR gate G5. The frequency of the output on line 8 will be (3/17) of the input frequency *fi*. With such an arrangement one may note that a single input pulse applied on the *fi* input line sometimes will cause one, two or three counts to be registered in counter CO. For example, the first and second input pulses each will cause one count to be registered. The third input pulse will advance the count to 3, whereupon gate G3 will cause the count to be quickly advanced to 4, and then inverter G4 will cause the count to be advanced to 5. The seventh input pulse will advance the count to 9, whereupon gate G3 will cause the count to be advanced to 10. It now will be apparent that by selecting different count conditions to add extra counts, one may provide any one of a large number of different relationships between an input frequency or pulse duration and an output frequency taken from a higher order output line of the counter. In any embodiment of the invention wherein output signals having recurring peiods of predetermined lengths are desired, the output signal or signals will be derived from one or more counter stages which are of higher order than the highest stage from which a signal is taken to disable the coincidence circuit at the counter input, since those stages used to provide disabling signals will be seen not to have regularly recurring periods.

In the embodiments thus far described, a means responsive to the occurrence of predetermined count conditions operates to notch an input signal so as to cause extra counts over and above the number of input pulses to be registered in the counter. In a modified arrangement illustrated in FIG. 4b, the occurrence of a predetermined count instead causes one or more of the input pulses on line 21 to be ignored by the counter CO. During the first seven counts, the output of inverter 12 is low and that of inverter 13 is high. At the 8th count inverter I1 provides a negative spike through C1 and inverter I2 charges up capacitor C2. The I3 output disables gate G1 until capacitor C2 discharges through R2 and the input circuit of I3. If the R2, C2 discharge time constant is sufficiently long, so that G1 remains disabled for slightly longer than the duration of the ninth input pulse, it will be apparent that the ninth pulse on line 21 will be ignored by counter CO. The frequency on output line 16 of the counter then will be (1/17) of the input frequency on line 21. It will be apparent that sensing different counter output lines, singly or in combination, to skip input counts can enable one to provide any one of a large number of different input-output frequency or repetition rate ratios.

From comparison of FIGS. 2 and 4*b* one may deduce that whether the momentary or transient disabling signal applied to gate G1 will increase or decrease the count registered by a given number of input pulses depends upon the time-constant of the disabling circuit, with provision of a short time-constant resulting in the addition of counts, while the provision of a long time-constant will result in one (or more) of the input pulses being ignored by the counter.

Further, the technique of skipping input counts at one counter state can be used together with the technique of adding input counts at another counter state to derive other desired input-output frequency ratios. Such an arrangement is partially shown in FIG. 4*c*, wherein inverter I3 (assumed to be controlled as shown in FIG. 4*b*) and gate G3 (assumed to be controlled as shown in FIG. 4*a*) both control line 22 as shown, so that input pulses on line 21 would be ignored every alternate 8th count, but an extra count would be added every alternate third count.

While the invention has been illustrated utilizing particular logic elements, those skilled in the art will recognize that various other logic circuits may be substituted in accordance with well-known principles to provide equivalent operation, and while the invention has been illustrated with the assumption that the counter CO in each embodiment comprises cascaded binary stages, it will be apparent that the principles of the invention are applicable as well to counters using decimal or other counting radices. While the input signal is shown as being rectified in FIG. 2, it will be readily apparent that rectification will not be necessary in numerous applications of the invention.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an enclusive property or privilege is claimed are defined as follows:

1. A device for converting a periodic input signal into a periodic output signal having a period which is equal to the sum of the periods of a predetermined number of input signals, comprising:

a gate circuit having at least two inputs, one of which is adapted to receive the input signals for passing the input signals through the gate to provide periodic gated pulses;

a counter which advances in response to the gated pulses for counting the gated pulses and providing the output signal;

feedback means connected to the other input of the gate circuit and responsive to the count condition of the counter for periodically temporarily disabling the gate circuit while an input pulse is passing there though causing a hiatus period in the input pulse during the temporary disabling preceded by a first pulse portion and followed by a last pulse portion, both pulse portions of the input pulse being counted by the counter causing an extra count in the counter for each temporary disabling;

a first delay means within the feedback means for delaying the feedback of the counter count condition to the gate circuit for defining the width of the first pulse portion; and a second delay means within the feedback means for defining the width of the hiatus period.

2. The device of claim 1 wherein the second delay means is a capacitor.

3. The device of claim 2, wherein both delay means are capacitors.

4. The device of claim 1, wherein:

the counter has an input portion responsive to the gated pulses from the gate circuit;

the counter has an output portion for providing the output signal; and the feedback means is responsive to the count condition in the input portion of the counter.

5. The device of claim 4, wherein the output portion of the counter provides a base period output the period of which is equal to the sum of the periods of a predetermined number of input signals; and wherein the output portion of the counter provides additional outputs having periods equal to multiples of the base period.

6. The device of claim 5, wherein the input portion and output portion of the counter each has a plurality of bistable stages.

7. The device of claim 6, wherein:

the feedback means is formed by electrical communication from at least the last stage of the input portion of the counter to the gate circuit;

the first stage of the output portion of the counter provides the base period output; and the other stages of the output portion of the counter provides the multiple base period output.

8. The device of claim 6, wherein the feedback means is formed by electrical communication from a plurality of the plurality of stages of the input portion of the counter to the gate circut.

* * * * *